United States Patent

[11] 3,632,022

| [72] | Inventors | Robert C. Simmonds, Jr.<br>Topsfield;<br>Andrew J. Gilbride, Swampscott, both of Mass. |
|---|---|---|
| [21] | Appl. No. | 863,965 |
| [22] | Filed | Oct. 6, 1969 |
| [45] | Patented | Jan. 4, 1972 |
| [73] | Assignee | USM Corporation<br>Flemington, N.J. |

[54] MOLDING MACHINERY
9 Claims, 11 Drawing Figs.

[52] U.S. Cl. .................................... 222/134,
222/135, 222/267, 222/309
[51] Int. Cl. ............................................. B67d 5/52
[50] Field of Search .......................................... 222/134,
135, 309, 267, 282; 141/107

[56] References Cited
UNITED STATES PATENTS

| 3,123,342 | 3/1964 | Little .............................. | 222/134 X |
| 3,386,623 | 6/1968 | Berrill et al. ..................... | 222/134 |
| 3,409,174 | 11/1968 | Radcliffe et al. ................ | 222/134 |

*Primary Examiner*—Robert B. Reeves
*Assistant Examiner*—Francis J. Bartuska
*Attorneys*—W. Bigelow Hall, Richard A. Wise and Aubrey C. Brine

ABSTRACT: Machinery for molding articles including a device for metering, mixing and dispensing a measured quantity of multiple component mixture to a plurality of molds. The device comprises a plurality of chambers each having a volume variable in response to fluid entering the chamber. One of the chambers contains a mixing element and dispensing means for the mixture. The constituent materials are metered into the other chambers, from which they are sequentially sent into the mixing chamber in measured quantity to be mixed and dispensed therefrom.

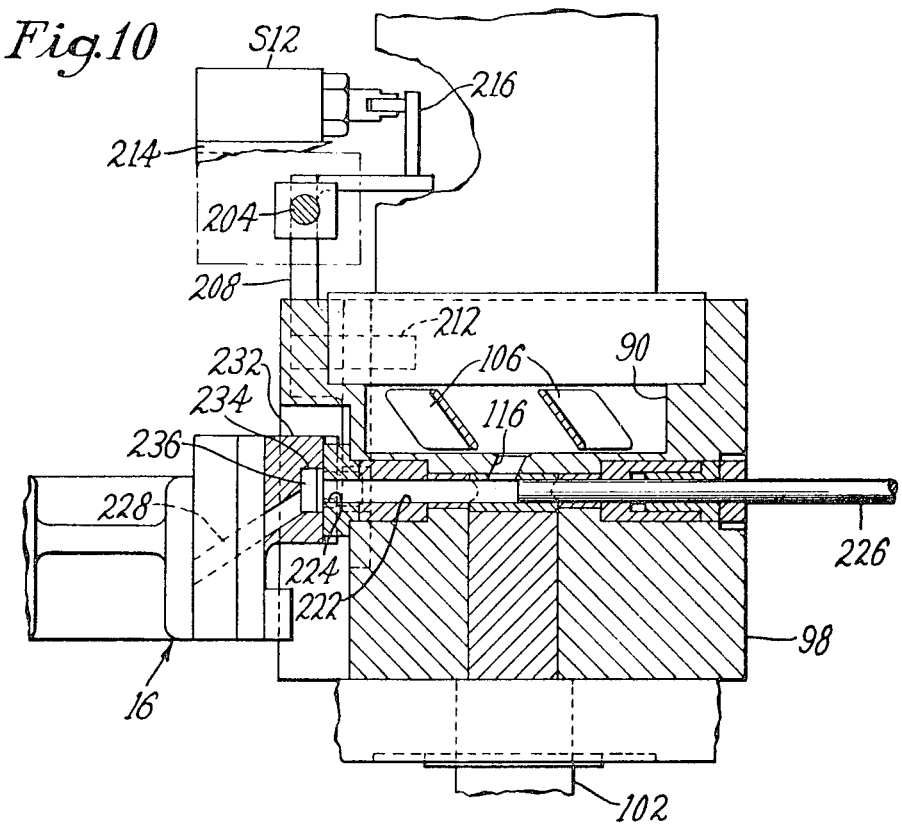
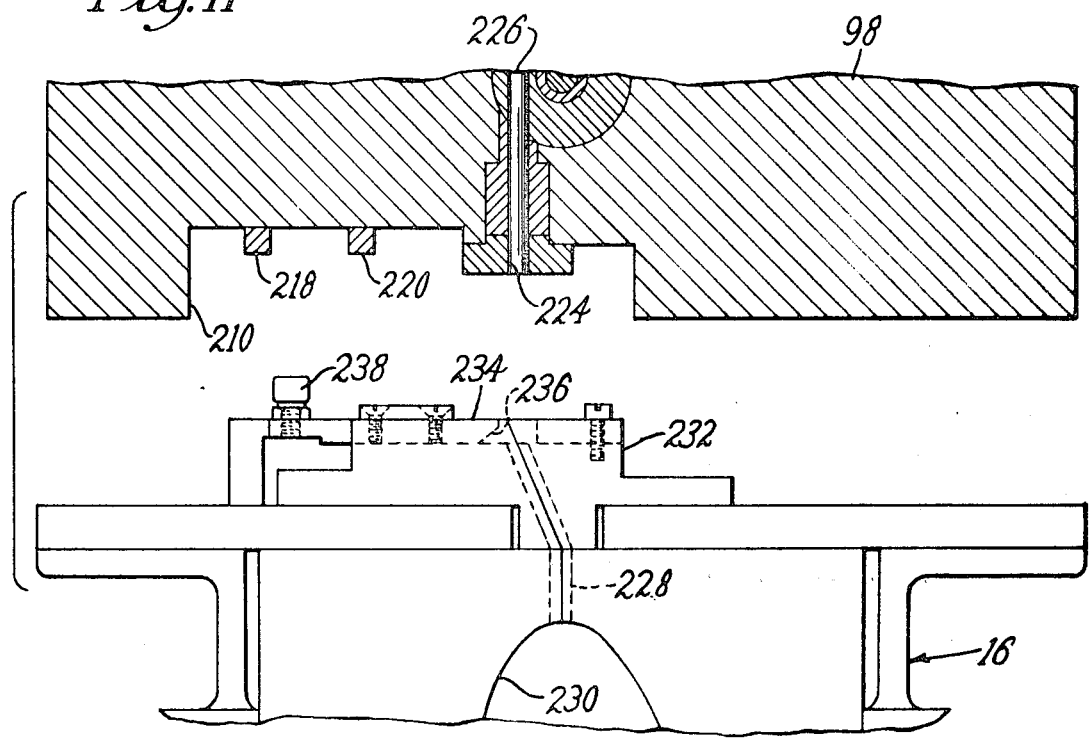

MOLDING MACHINERY

BACKGROUND OF THE INVENTION

This invention relates to a machine for molding plastics material including mixing and dispensing apparatus and more particularly to a device for metering, mixing and dispensing multiple component mixtures, such as polyurethane or other like materials.

Heretofore various devices have been presented for mixing multicomponent formulations, many of which are adaptable for the preparation of urethane materials for use in a molding process. One such device is described in U.S. Pat. No. 3,386,623, issued June 4, 1968 and assigned to the assignee of the present invention. That device provides a dispensing passage to which the reactant materials are fed in adjustable ratios from metering cylinders. Another device is described in U.S. Pat. No. 3,409,174, issued Nov. 5, 1968 and also is assigned to the assignee of the present invention. This latter device provides a mixing chamber for receiving reactants, a high-speed agitator at one end of the chamber for mixing the reactants, ports for admitting the reactants into the chamber and a discharge nozzle located at the same end of the chamber for extruding the mixture. The constituent materials are measured into the mixing chamber in sequence, after which they are discharged through the nozzle to a mold assembly While these machines as previously described have proved to be successful for most applications, a need has arisen for a machine which is particularly adaptable to the processing of solvent blown systems, and wherein a great deal of accuracy is required in the ration of constituent materials. It has been found that gas generation in formulations or from a solvent blown system may cause loss of accuracy when measuring the components in the mix chamber as in the aforementioned machine.

It is, therefore, an object of the present invention to provide an improved apparatus for mixing and dispensing multiple components which react to form a fluid material.

Another object of the invention is to provide apparatus which is effective to accurately measure and mix materials which may vary in characteristic over a wide range.

Still another object of the invention is to provide apparatus which is effective to accurately measure and mix materials wherein gas generation may be caused by the reaction of the constituent materials.

SUMMARY OF THE INVENTION

The above objects, and other objects which will become apparent as the description proceeds, are achieved by providing molding machinery including apparatus having a plurality of chambers, each chamber presenting a volume which is variable in response to fluid entering the chamber. One of the chambers is provided with a means for mixing the components contained therein and means for injecting the components, after mixing into a mold assembly.

Storage means is provided for each of the components to be mixed and conduit means connecting the component storage means with a respective chamber for metering the material. Conduit means is provided for connecting the metering chambers with the mixing chamber to define a substantially closed flow circuit from the storage means, through the metering and mixing chambers to the injection means, the closed circuit having a volume variable in response to fluid entering the system.

Power means is operatively associated with each of the metering chambers, which power means is generally operable by switch means responsive to fluid entering the respective metering chambers. By locating the switch means for slidable adjustment on a pivotal sine bar arrangement, the ratio of volume of fluid metered to the mixing chamber is readily adjustable, while the total volume of mixture may be changed without changing the ratio of the constituent material volumes.

BRIEF DESCRIPTION OF THE DRAWINGS

The novel features that are considered characteristic of the invention are set forth in the appended claims; the invention itself however, both as to its organization and method of operation, together with additional objects and advantages thereof, will best be understood from the following description of a specific embodiment when read in conjunction with the accompanying drawings, in which:

FIG. 10 is an elevational sectional view taken substantially along the line X—X of FIG. 6 and showing further details of that structure; and FIG. 11 is a sectional view similar to FIGS. 7 through 10 showing the operative elements of the machine prepared for mating prior to injecting material into the mold.

DESCRIPTION OF THE PREFERRED EMBODIMENT

Figure 1:
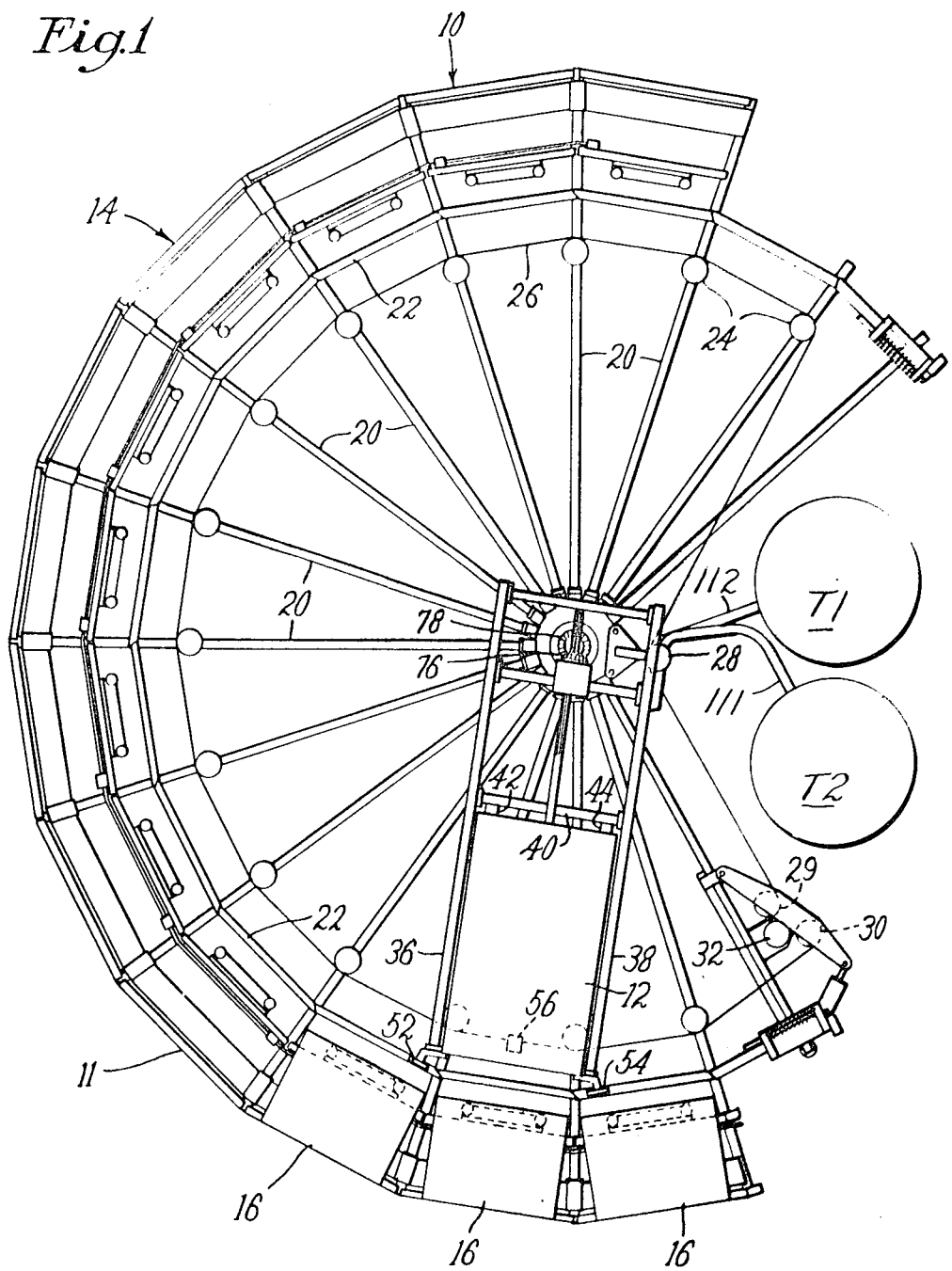
FIG. 1 is a plan view showing one form of molding apparatus housing the present invention embodied therein.
Figure 2:
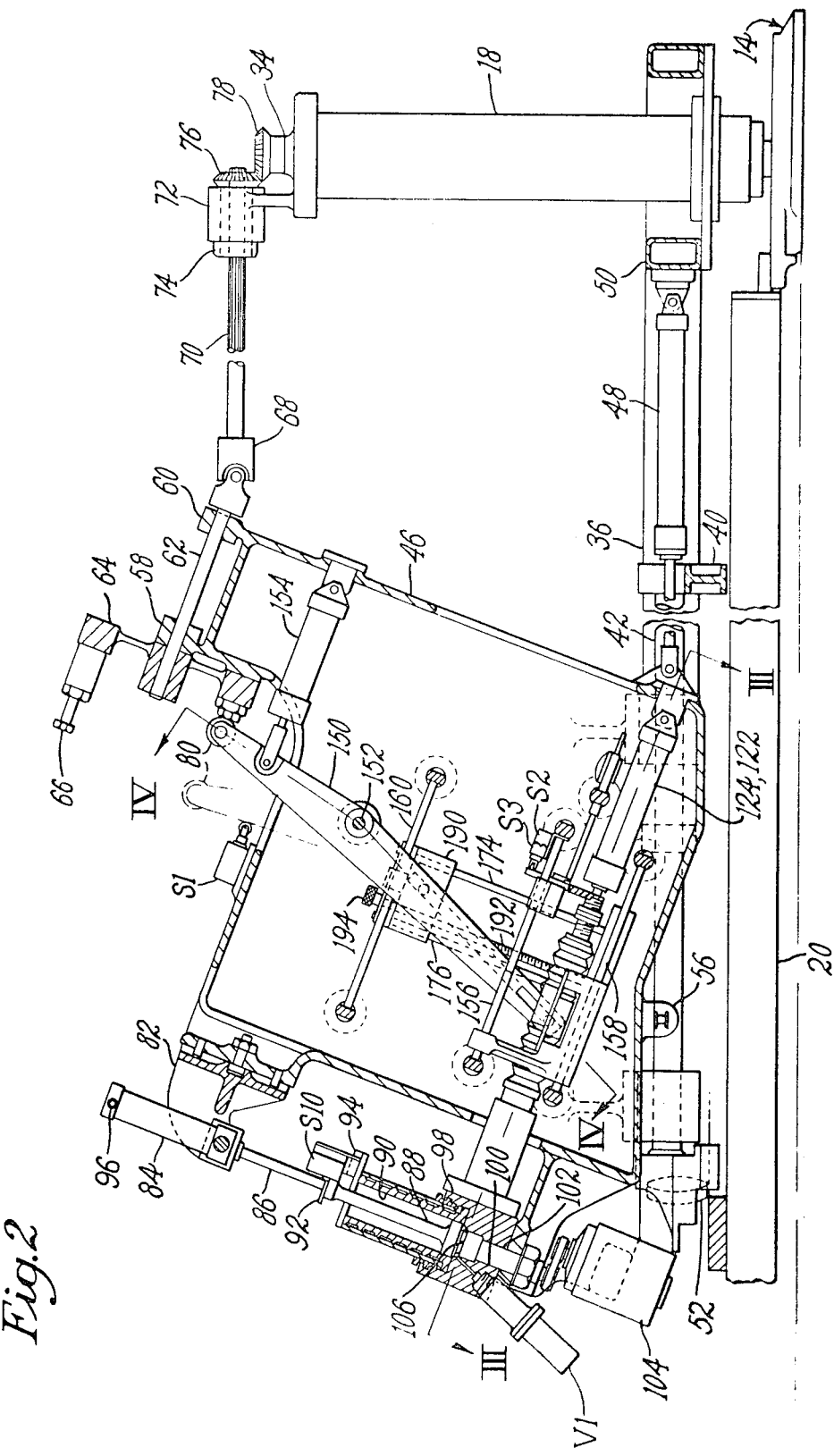
FIG. 2 is an elevational view partly in section showing a portion of the apparatus of FIG. 1 taken on an enlarged scale for clarity.

Referring now to the drawings and particularly FIGS. 1 and 2 there is shown a molding apparatus 10 comprising a mixer assembly 12 and supporting framework 14. The framework 14 comprises a plurality of mold-receiving stations 11 arcuately arranged and located about the periphery thereof. Each of the mold stations 11 is provided with means for receiving and retaining a mold assembly 16. The framework 14 also comprises a housing 18 disposed substantially at the center of the mold stations 11, and having a plurality of radial members 20 extending outwardly therefrom.

A continuous track 22 is disposed adjacent the mold stations 11. The radial members 20 thus provide support for the track 22 and for a plurality of sprockets 24 having a chain 26 passing over them. The chain 26 is continuous and extends over the sprockets 24, a sprocket 28 mounted on the framework 14, and over a pair of idler sprockets 29 and 30 to a drive sprocket 32.

Referring now particularly to FIG. 2 it will be observed that the housing 18 is mounted on a stationary shaft 34, for rotational movement about the shaft. A mixer support frame having a pair of side members 36 and 38 and a cross brace 40 is attached to the housing 18, and extending forwardly from the cross brace 40 are a pair of slide bars 42 and 44 mounted on which a mixer housing 46 is mounted. A double-acting cylinder 48 connects the mixer housing 46 with a cross brace 50 of the mixer support framework and serves to move the housing 46 along the slide bars 42 and 44 when actuated.

It will be noted that a pair of wheels 52 and 54 are provided to support the outermost end of the mixer support structure, the wheels being received in the track 22. A boss 56 extends downwardly from the mixer housing 46 and is attached to the chain 26. Thus, when the cable 26 is moved by the drive sprocket 32, the mixer housing 46 is caused to move from one station to another, and the double acting cylinder 48, when actuated, is effective to move the housing 46 toward and away from a mold assembly 16.

Figure 5:
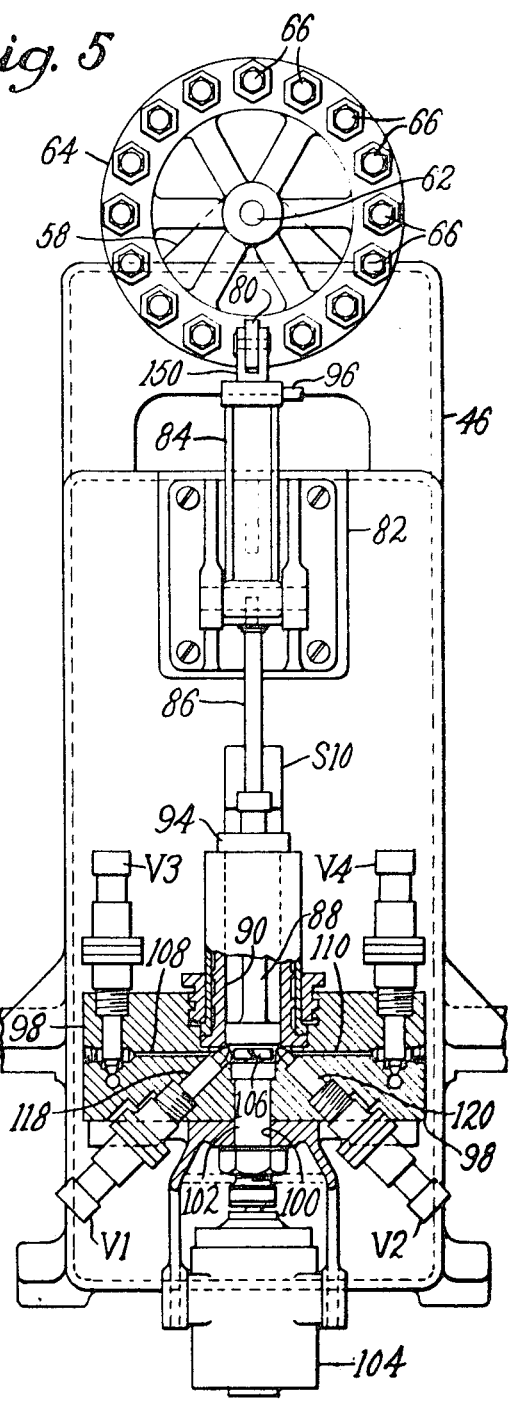
FIG. 5 is an elevational view partly in section taken along lines V—V of FIG. 3.

Referring now to FIGS. 1 and 2, taken in connection with FIG. 5, the mixer housing 46 will be seen to have a pair of bearing housings 58 and 60 for receiving a shaft 62. On one end of the shaft 62 is affixed a dial member 64 having threaded openings for receiving a plurality of adjustable elements in the form of hex head bolts 66. The opposite end of the shaft 62 is attached through a universal joint 68 to a spline shaft 70. A bearing assembly is mounted in a housing 72 and receives a shaft 74 with internal splines for receiving the shaft 70. The shaft 74 is captive in the housing 72 and has at one end a beveled gear 76 in mating relation with a beveled gear 78 affixed to the stationary shaft 34.

From the foregoing, it may be observed that rotation of the housing 46 about the stationary shaft 34 causes rotation of the dial member 64, and by means of the spline shaft 70, movement of the housing 46 toward and away from the shaft 34 may be accomplished without effecting rotation of the dial 64.

It should here be explained that the number of adjustable elements 66 and their location on the dial 64 is generally arranged such that with the arrival of the mixer assembly at each station, a different element 66 is located adjacent a roller 80 disposed on the mixer assembly. While a more lengthy description of the operation of the mixer assembly 12 will be offered as the description proceeds, it will be sufficient here to say that the location of the roller 80 with respect to the dial 64 is effective to control the volume of material to be dispensed from the mixer assembly 12. Thus, by marking the dial member 64 with suitable indicia to correspond to the mold station 11 at which the respective elements 66 will contact the roller 80, the bolts may be adjusted by threadedly turning them into the dial 64 or backing them from the dial, to provide a length to control the quantity of material dispensed to that quantity required by a given mold at the respective mold stations.

Referring now to FIGS. 2 through 5, the mixer housing 46 has attached thereto a bracket 82 which supports an hydraulically dampened cylinder 84 in which there is located a movable piston connected to one end of a piston rod 86. The opposite end of the rod 86 is affixed to a mixing chamber piston 88 which slidingly engages the inside wall of a mixing chamber 90 to form a chamber expandable through movement of the piston therein. The piston 88 may be of a rubberlike material for affording a close fit with the wall of the chamber 90. The rod 86 is further provided with a switch actuator flange 92 which is engageable with an injection stop switch S10 connected to the housing 46 by means of a bracket 94.

The cylinder 84 is provided with an air line 96 which is connected to a source of air under pressure (not shown), effective to cause movement of the piston in the cylinder 84 when applied to the cylinder, with a resultant movement of the mixing chamber piston 88 and the flange 92. The movement of the piston 88 in the downward direction is thereby effective to cause substantial emptying of the mixture in the mixing chamber 90, as will be further described hereinbelow.

A block 98 having a recess forming the bottom portion of the mixing chamber 90 mounted on the housing 46 and retains mixing chamber inlet valve means for components A and B which are supplied to the mixer from storage tanks T1 and T2 (FIG. 1), and also mixing chamber agitator means. The storage tanks may be of any suitable type such as those disclosed in U.S. Pat. No. 3,409,174.

The block 98 is further provided with a bore 100 for retaining the mixing chamber agitating means. The bore 100 receives a bearing in which is mounted a shaft 102 rotatable at high speed by an electric motor 104 held by a bracket to the underside of the housing 46. The end of the shaft 102 remote from the motor 104 is provided with a mixing member 106 disposed in an enlarged portion of the bore 100.

The block 98 has a pair of cylindrical bores 108 and 110 formed therein which receive inlet fittings with in turn receive a pair of component A & B discharge lines 112 and 111 respectively. The lines 112 and 111 are connected to the pressurized storage tanks T1 and T2 respectively which contain supplies of the components A and B.

The block 98 is provided with still another cylindrical bore 116 (FIG. 10) which is connected to the injection nozzle of the machine through which mix is dispensed during an injection operation.

Adjacent to the lower portion of the block 98, and connecting into bores 108 and 110 respectively are a pair of valve means V1 and V2 which serve to control the flow of component A and component B material into the mixing chamber 90. The valve V1 comprises a plunger element 118 which operates through a diaphragm arrangement and extends into a bore which intersects with the bore 108 and opens into the chamber 90. In like manner the valve V2 is provided with plunger 120 which operates through a diaphragm and extends upwardly into a bore opening into the mixing chamber 90 and intersecting the bore 110. Each of the valves V1 and V2 are operatively connected to pneumatic cylinders which serve to operate the plungers 118 and 120. The pneumatic cylinders are connected into a control circuit which sequence of operation will be explained in greater detail as the description proceeds.

Figure 3:
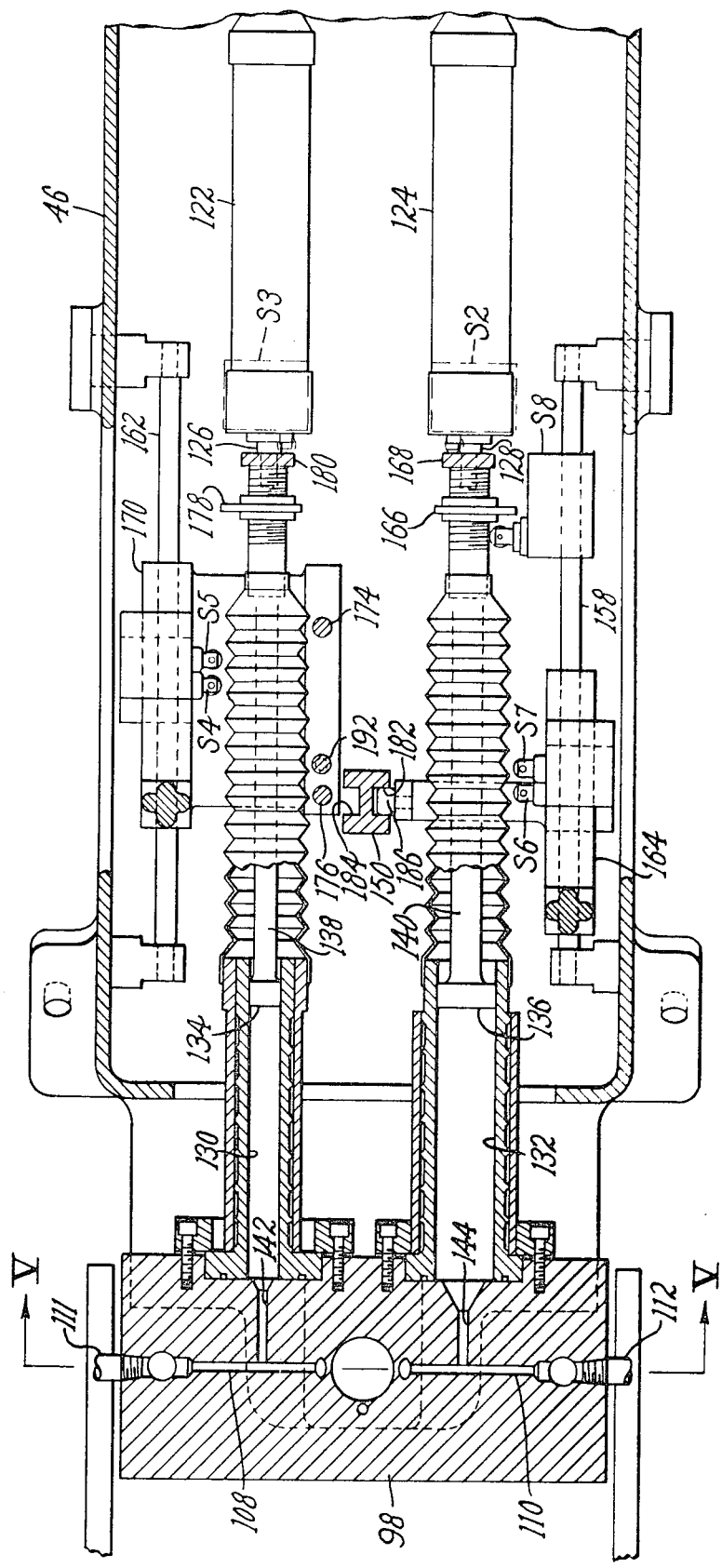
FIG. 3 is a sectional plan view taken along the line III—III of FIG. 2, showing details of the structure of FIGS. 1 and 2 taken on an enlarged scale.
Figure 4:
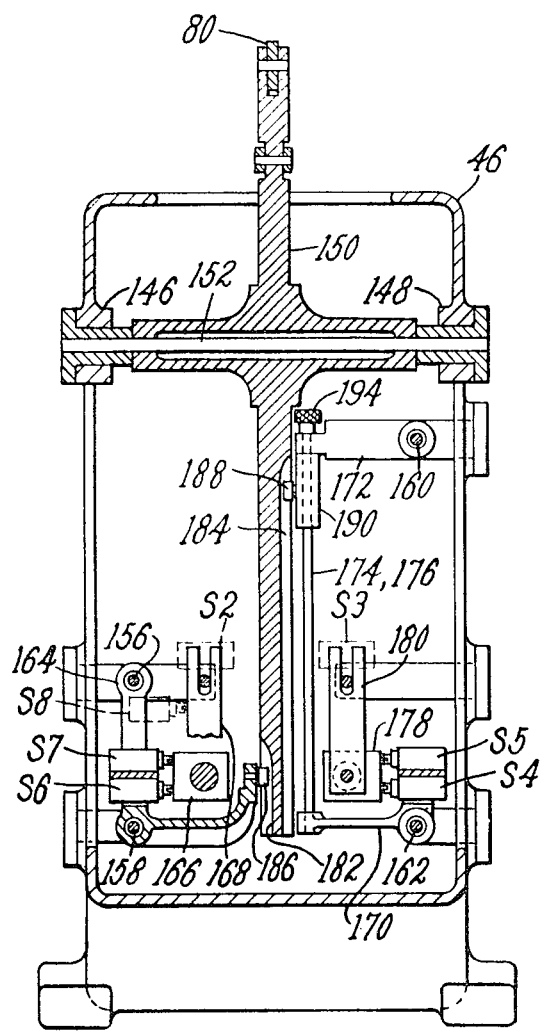
FIG. 4 is a sectional view taken along the lines IV—IV of FIG. 2 showing further details of the structure.

Referring particularly to FIG. 3 taken in connection with FIGS. 2, 4 and 5 it will be observed that the block 98 further serves to support the constituent material metering means, which is effective to provide material to the mixing chamber 90. The pair of pneumatically actuated cylinders 122 and 124 are pivotally attached to the housing 46 and have a pair of piston rods 126 and 128 respectively extending downwardly therefrom.

A pair of cylindrical chambers 130 and 132 which may be of different diameters, and of expandable volume by virtue of freely movable pistons 134 and 136 disposed therein, are mounted on the block 98 substantially in alignment with the rods 126 and 128. A pair of piston rods 138, 140 having one end operatively connected to the pistons 134 and 136 respectively, have their opposite ends connected to the rods 126 and 128 respectively such that through operation of the pneumatic cylinders 122 and 124, the pistons 134 and 136 are moved to change the volume of the cylindrical chambers 130 and 132. It should also be understood that with the cylinders 122 and 124 unpressurized, fluid entering the chambers 130 and 132 is effective to cause movement of the pistons 134 and 136 thus changing the volume of the chambers. Near the bottom end of the chambers 130 and 132, a pair of valve members V3 and V4 are mounted in the block 98 to control the entry of material into the respective chambers from the lines 111 and 112. A pneumatic cylinder provides for movement of a valve stem in valve V3 which is effective to open or close the inlet to the bore 108 and a side bore 142 leading to the chamber 130. In like manner, the line 112 leading into the bore 110 and subsequently to a side bore 144 is opened or closed by the valve V4. Each of the cylindrical chambers 130 and 132 is thereby connected in a closed fluid flow path leading from the storage tanks T1, T2 which supply the component A and component B material to the chambers and terminating in the chamber 90 for mixing and dispensing to a mold.

The means for metering the components A and B is generally controlled by the ratioing system as supported by the housing 46 and shown in detail in FIGS. 2, 3 and 4. The housing 46 is provided with a pair of bosses 146, 148 to which a sine bar member 150 is connected by a shaft 152. Near the end of the sine bar 150 at which the roller 80 is disposed, there is pivotally mounted a pneumatic cylinder 154 which has one end pivotally attached to the housing 46. As best shown in FIG. 2, the cylinder 154 is effective in its operation to move the sine bar 150 about the pivot shaft 152 to a position out of contact with the dial 64, when the dial is being rotated.

Referring now particularly to FIGS. 3 and 4, it will be seen that the housing 46 is provided with a pair of parallel rods 156 and 158 disposed adjacent one side thereof, and a second pair of parallel rods 160 and 162 disposed adjacent the opposite side of the housing. A switch support member 164 having a pair of switches S6 and S7 mounted thereon is slidably mounted on the rods 156 and 158, the switches being aligned for contact with a flange 166 mounted on the piston rod 128. Another switch S8 is mounted for adjustable movement along the rod 156 and is aligned for contact by an arm 168 extending from the piston rod 128. It will also be noted that with the piston rod 128 in its fully retracted position, the arm 168 is effective to contact a switch S2 affixed to the housing 46.

At the opposite side of the housing 46, a switch support member 170 is slidably mounted on the rod 162 and has the switches S4 and S5 mounted thereon. A slide block 172 has slidably mounted on the rod 160 and is connected to the support member 170 by a pair of parallel rods 174 and 176 to form a unitary slidable structure. The piston rod 126 is provided with a flange 178 aligned for contact with the switches S4 and S5, and an arm 180 extends outwardly from the rod to contact a switch S3 mounted on the housing 46, when the piston 122 is in its fully retracted position.

As will be fully appreciated from observing FIGS. 3 and 4, the novel ratio system and volume control is characterized by the sine bar 150 which is effective to provide a preselected volume of the material in a constant ratio which is selected by location of the switches S4, S5, S6, and S7. To this end, the sine bar 150 is provided with a slot 182 on one side thereof, and a slot 184 on the opposite side. The slot 182 receives a roller 186 attached to a flanged portion of the switch support member 164. The slot 184 receives a roller 188 mounted on a movable block 190. The block 190 is threadedly received on a rod 192 supported between the slide block 172 and the switch support member 170. A knurled knob 194 is provided at the end of the rod 192 and by rotating the knob, the block 190 is moved along the rod 192. Thus, by moving the block 190 along the rod 192, the relationship between the location of the switches S4, S5, and switches S6, and S7 is changed to change the ratio of materials to be mixed in the mixing chamber.

Figure 6:
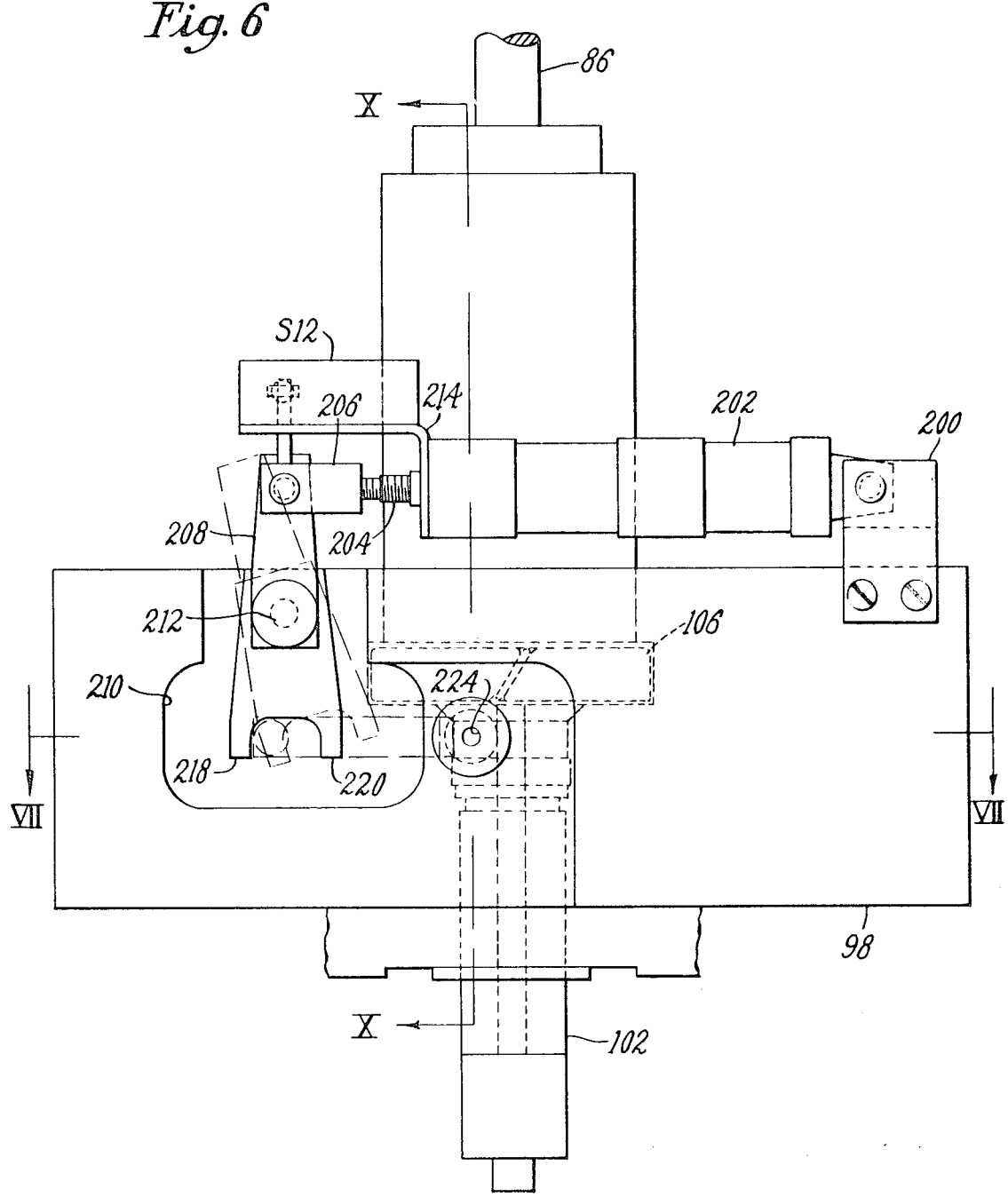
FIG. 6 is an elevational view showing a portion of the structure of FIG. 2 taken on a greatly enlarged scale.

Referring now to FIGS. 6 through 11 there is shown a novel apparatus for removing material from the sprue of the dispensing apparatus between shots of material provided to a mold. As shown in FIG. 6, the face of the block 98 is provide with a bracket 200 from which a cylinder 202 is pivotally suspended. The cylinder 202 is of a double-acting type and provided with fluid pressure from a pressure source (not shown). A piston rod 204 extends from the cylinder 202 and is connected to a block 206 which straddles a lever arm 208.

Figure 7:
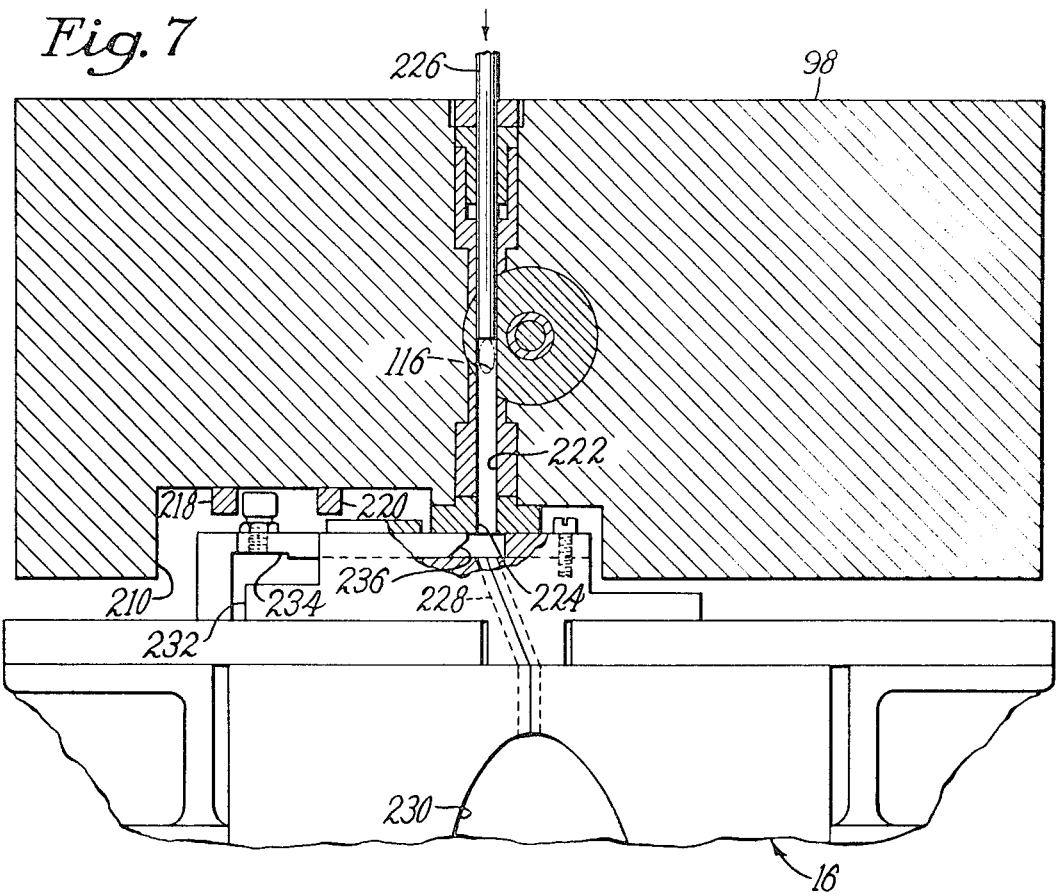
FIG. 7 through 9 are sectional views taken along the lines VII—VII of FIG. 6 showing the elements during operation of the device of FIG. 6.

As best shown in FIGS. 6 and 7 the face of the block 98 is cutout to form a recessed portion 210, and the lever arm 208 is pivotally supported by a pin 212 for movement within the recess 210. A bracket 214 is attached to the cylinder 202 and has mounted thereon a microswitch S12 in alignment for activation by contacting an L-shaped flange 216 extending upwardly from the lever arm 208. The lever arm 208 is thus rotatable by pressurizing the cylinder 202 which causes the lever arm to pivot about the pin 212, the flange 216 contacting the microswitch S12 and a pair of downwardly extending fingers 218 and 220 serving to operate on a mating mold assembly 16.

As will be observed particularly in FIGS. 7 and 10 a sprue channel 222 is provided in the block 98, terminating in a sprue outlet 224 at the face of the block. The outlet bore 116 leading from the chamber 90 enters into the sprue channel 222 and a valve rod 226 is movable in the channel to open and close the bore 116. The valve rod 226 is actuated by a fluid operated cylinder (not shown) and travels from the position shown in FIG. 10 to the position shown in FIG. 11, where the end of the valve rod is flush with the face surface of the sprue outlet 224.

Referring now to FIGS 7 through 10 the mold assembly is provided with a sprue 228 leading from a mold chamber 230 and disposed substantially at the mold part line. The mold sprue 228 extends from the mold proper through a bearing block 232 in which a shutter member 234 is slidably retained. The shutter member 234 has a tapered edge 236 which slides across the inlet of the mold sprue 228 to substantially close the sprue when in the position shown in FIG. 9.

A roller 238 is attached to one end of the shutter member 234 and extends from the mold assembly 16 such that when the outer surface of the shutter 234 is in mating engagement with the face of the sprue outlet 224 the roller is disposed between the fingers 218 and 220 of the lever arm 208.

Figure 8:
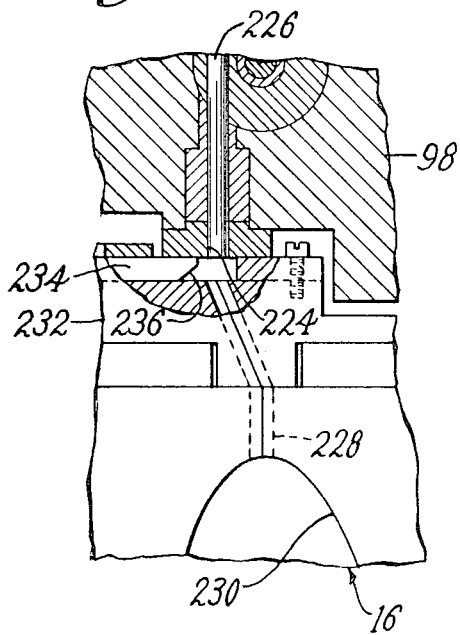

In operation, the dispensing apparatus is brought up to mate with the mold assembly 16, as in FIG. 11 which shows the block 98 and the mold assembly 16 just prior to contact. The valve rod 226 is retracted to the position shown in FIG. 10 and material flows into the mold chamber 230 through the sprue channel 222 and the mold sprue 228. On completion of the injection operation, the control circuit sends a signal to the actuator for the valve rod 226 and the rod is moved forward to close off the bore 116 and force the material from the sprue 222 into the mold, the rod 226 terminating its travel at a position as shown in FIG. 8. The circuitry then actuates the cylinder 202 which rotates the lever arm to the dot-dash position shown in FIG. 6 which moves the shutter 234 to the position shown in FIG. 9.

As will be observed, the shutter member 234 serves to close off the mold sprue 228 and additionally completely wipes the face surface of the sprue outlet 224 as well as the valve rod 226 of any material left thereon. By virtue of the tapered surface of the edge 236, the material wiped from the elements is forced into the mold cavity 230.

The cylinder 202 is then actuated to bring the lever arm back to the position shown in FIG. 6, however, the fingers 218 and 220 are so spaced that the movement does not reopen the shutter member 234. The dispensing apparatus may now be moved to the next mold assembly, the entire sprue channel 222 and surface adjacent the outlet 224 being free of any material from the previous shot.

In a typical sequence of operation, a plurality of mold assemblies 16 are arranged at the mold assembly stations 11 in an arcuate fashion. The mixer assembly 12 is in its rearwardmost position, adjacent to the housing 18 and in alignment with a mold station. With the valves V1 and V2 in the closed position, the cylinder 154 is activated to bring the roller 80 in contact with an element 66 which has been set to reflect the volume of the aligned mold assembly 16. The sine bar 150 is now located such that the switches S4, S5, and S6, S7 are disposed in the proper volume location to meet the needs of a mold assembly 16 mounted at the station 11 where the mixer assembly 12 is disposed. On a signal from the circuit the cylinder 48 moves the mixer assembly 12 toward the mold assembly 16 and engagement takes place between the two assemblies. With the valves V3 and V4 closed, valve V2 is opened and the cylinder 124 activated to force the piston 136 downward into the cylinder and the component material contained therein into the mixing chamber 90. Valve V2 is then closed and valve V1 opened to provide a shot of reactant material from the chamber 130 into the mixing chamber 90 in a similar manner, the valve V1 being closed on completion of the metering step.

In metering the proper quantities of material to the mixing chamber 90, piston 136 moves downwardly until the flange 166 contacts first the switch S7 to retard motion of the piston and then the switch S6 which stops motion of the piston. In like manner, the piston 134 moves downward until the flange 178 contacts first the switch S5 and then the switch S4 to meter the proper quantity of material from the chamber 130 to the mixing chamber 90.

It will be noted that at this time the cylinder 84 is unpressurized and vented such that entry of fluid into the chamber 90 causes the piston 88 to rise in response to the entering fluid.

In providing machinery which is both efficient and effective in operation, the circuitry of the present machinery is setup such that while the piston 134 is being moved to provide material to the mixing chamber 90 valve V4 is opened and material is forced from the storage tank T1 into the chamber 132 to refill the chamber. In refilling, the piston 136 is caused to move in the chamber 132 by the fluid entering the chamber until the arm 168 contacts the switch S2 which is effective to close the valve V4 and stop the flow of material into the line 112.

Upon completion of the metering of material into the chamber 90, valve V3 is opened and a new charge of material is forced from the storage tank T2 of reactant material into the chamber 130. The piston 134 is caused to move by fluid entering the chamber 130, until the arm 180 contacts the switch S3 which is effective to close the valve V3 and stop the flow of material from the tank.

With the chamber 90 now containing a proper quantity of material the mixing member 106 is rotated by the motor 104 and the material is mixed.

After a suitable time delay in the circuitry, the valve rod 226 is retracted to the position shown in FIG. 10 and the piston 88 is moved downwardly by action of the cylinder 84 until contact is made with switch S10 signaling the circuit that the entire shot of material has been sent to the mold assembly 16.

Figure 9:
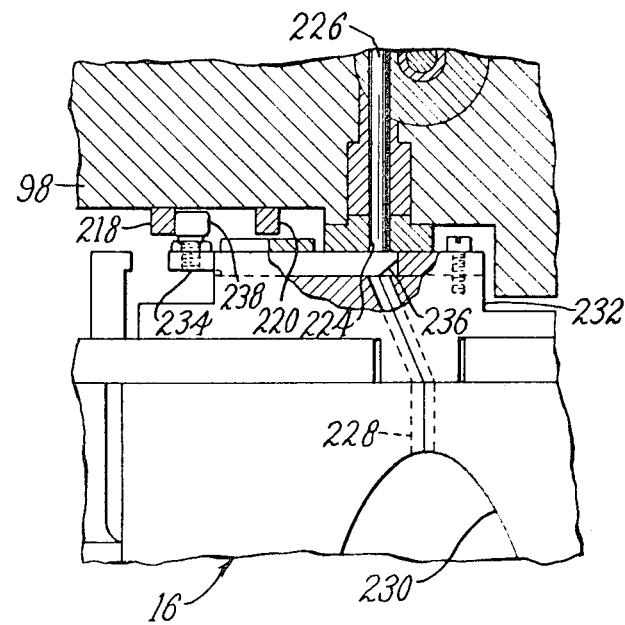

In sequence, on signal from the switch S10, the valve rod 226 is moved to its forwardmost position as shown in FIGS. 8 and 9, and the cylinder 202 is activated to cause the shutter member 234 to move to the closed position as shown in FIG. 9. The cylinder 202 is again activated to move the lever arm 208 to the position shown in FIG. 6 and contact with the switch S12 signals the circuit that the next sequence of operation is to take place.

It should here be noted that contact of the switch S10 which signals the circuit that the material has been evacuated from the mixing chamber is also effective to open the valve V2 and activate the cylinder 124 to send a charge of material from the chamber 132 into the mixing chamber 90 to prevent further reaction of the constituent materials in the chamber. The purge charge sent into the mixing chamber 90 is determined by the location of the switch S8 on the rod 158, which is adjustable. Thus, the piston 136 moves downwardly until the arm 168 contacts the switch S8 and a partial charge of material now remains in the chamber which is diluted by the material from chamber 132 to the extent that substantially no reaction takes place.

With the purge shot located in the mixing chamber 90 and the face of the sprue outlet 224 as well as the sprue passage 226 substantially devoid of material by virtue of the action of the shutter member 234 and the valve rod 226, cylinder 48 is activated to move the mixer assembly 12 back toward the housing 18 and the cylinder 154 is activated to move the sine bar 150 to contact the switch S1. The switch S1 signals the circuit that the sine bar 150 is out of contact with the dial 64 and the apparatus is ready to be moved to the next station.

The drive wheel 32 is now rotated by power means (not shown) and the mixer assembly 12 is caused to move to the next station. As will be evident from FIG. 2, movement of the mixer assembly 12 causes rotation of the dial 64 and a new volume-controlling element 66 is moved to a position in alignment with the roller 80.

Thus located, the sequence of operation as hereinabove set forth is repeated to provide material to a mold assembly 16 located at the new station 11.

It might be well to herein note, that by rotating the knob 194 and thereby adjustable locating the switches S5, S4 in relation to the switches S6 and S7 a new ratio of component material to reactant material may be setup. The ratio thus setup, will not vary as the volume is changed through operation of the sine bar 150, in that the geometrical arrangement of the switches S4, S5 and S6, S7 is such that movement of the sine bar about the axis 152 is effective to cause change in volume only without changing the ratio of the constituent material to the reactant material.

In addition, while the various switches that have been mentioned are not shown in a complete circuit, it is considered that it is well within the state of the electrical art to provide a suitable circuit in which the switches as hereinbefore set forth will function in the proper sequence as described.

Having thus described our invention, what we claim as new and desire to secure by Letters Patent of the United States is:

1. Apparatus for metering, mixing and dispensing multiple component mixtures comprising
 a plurality of chambers each having a volume independently variable in response to fluid entering or leaving a chamber,
 one of said chambers having means for mixing the components and means for injecting the mixture from the one chamber into a mold assembly,
 a storage tank for each of the components to be mixed, and conduit means connecting each of said other chambers with a respective storage tank,
 a first conduit connecting a first of said other chambers with said one chamber, and a second conduit connecting a second of said other chambers with said one chamber each of said first and second chambers having an independently movable piston slidably disposed therein connected to a piston rod extending from said chamber, power means connected to each of said first and second chamber pistons for causing flow of fluid from a respective chamber to said one chamber and a first switch means having an actuator located for contact by a portion of said piston rod extending from said first chamber, and a second switch means having an actuator located for contact by a portion of said piston rod extending from said second chamber, said first and second switch means further being operatively connected to said power means whereby the flow of fluid from said first chamber to said one chamber and from said second chamber to said one chamber is terminated by movement of the piston in the respective first and second chambers.

2. Apparatus as set forth in claim 1 which further includes an elongated member having each of said first and second switch means connected thereto, said member further being pivotally supported for movement toward and away from said first and second chambers to cause movement of said first and second switch means toward and away from said chambers such that movement of said member is effective to change the volume of fluid metered into said one chamber from each of said chambers when said pair of switch means are contacted by a respective piston rod to terminate flow of fluid into said one chamber, and said first and second switch means being connected to said member such that the ratio of the volume of fluid metered from each of said chambers is maintained substantially constant during movement of said member.

3. Apparatus as set forth in claim 2, wherein at least one of said first and second switch means is slidably connected relative to said member for adjustable movement along the length of said member such that the ratio of the volume of fluid metered from each of said chambers is readily variable by movement of said one switch means relative to the other.

4. Apparatus as set forth in claim 3, which further includes drive means connected to said elongated member for moving said member about said pivotal connection toward and away from said pair of chambers.

5. Apparatus as set forth in claim 4, which further includes valve means in said conduit means connecting said other chambers with said one chamber and means for automatically opening and closing said valve means sequentially to cause flow of fluid to said one chamber from only one other chamber at a given time.

6. Apparatus for metering, mixing and dispensing multiple component mixtures comprising a plurality of chambers each having a volume independently variable in response to fluid entering and leaving a chamber; one of said chambers having means for mixing the components and means for injecting the mixture from the one chamber into a mold assembly, storage means for each of the components to be mixed, conduit means connecting each of said other chambers with a component storage means and with said one chamber whereby said chambers and said conduit connecting means define a substantially closed flow circuit having a volume expandable in response to fluid entering from said storage means and contractable in response to fluid injected into a mold, valve means in said conduit means connecting said other chambers with said one chamber, and means for automatically opening and closing said valve means sequentially to cause flow of fluid to said one chamber from only one other chamber at a given time.

7. Apparatus for metering, mixing and dispensing multiple component mixtures comprising a plurality of chambers each having a volume independently variable in response to fluid entering and leaving a chamber, one of said chambers having means for mixing the components and means for injecting the mixture from the one chamber into a mold assembly, storage means for each of the components to be mixed, conduit means connecting each of said other chambers with a component storage means and with said one chamber whereby said chambers and said conduit connecting means define a substantially closed flow circuit having a volume expandable in response to fluid entering from said storage means and contractable in response to fluid injected into a mold, independent power means operatively associated with each of said other chambers for causing flow of fluid from each of said other chambers into said one chamber and means responsive to the volume change of each of said other chambers to shut down its respective power means to terminate flow of fluid into said one chamber.

8. Apparatus for metering, mixing and dispensing multiple component mixtures comprising a plurality of chambers each having a volume independently variable in response to fluid entering and leaving a chamber, one of said chambers having means for mixing the components and means for injecting the mixture from the one chamber into a mold assembly, storage means for each of the components to be mixed, conduit means connecting each of said other chambers with a component storage means and with said one chamber whereby said chambers and said conduit connecting means define a substantially closed flow circuit having a volume expandable in response to fluid entering from said storage means and contractable in response to fluid injected into a mold, each of said plurality of variable volume chambers comprising structure forming a cylindrical bore having an independently movable piston slidably disposed therein, independent power means connected to each of said pistons in said other chambers for causing flow of fluid from each of said other chambers into said one chamber bore to expand the chamber volume by moving the piston in said one chamber bore, and means responsive to movement of each of said pistons in each of said other chamber bores to shut down its respective power means to terminate flow of fluid into said one chamber bore.

9. Apparatus as set forth in claim 8, which further includes valve means in said conduit means connecting said one chamber with said other chambers and means for automatically opening and closing said valve means sequentially to cause flow of fluid to said one chamber from only one other chamber at a given time.

* * * * *